United States Patent
Gao et al.

(10) Patent No.: US 12,031,036 B2
(45) Date of Patent: Jul. 9, 2024

(54) RUBBER COMPOSITION WITH REDUCED ODOR AND GOOD THERMAL OXIDATIVE AGING-RESISTANT AND ANTI-FATIGUE PROPERTIES

(71) Applicant: Sennics Co., Ltd., Shanghai (CN)

(72) Inventors: Yang Gao, Shanghai (CN); Jin Zhang, Shanghai (CN); Zhimin Tang, Shanghai (CN)

(73) Assignee: Sennics Co., Ltd., Shanghai (CN)

( * ) Notice: Subject to any disclaimer, the term of this patent is extended or adjusted under 35 U.S.C. 154(b) by 54 days.

(21) Appl. No.: 17/500,302

(22) Filed: Oct. 13, 2021

(65) Prior Publication Data
US 2022/0112361 A1    Apr. 14, 2022

(30) Foreign Application Priority Data

Oct. 13, 2020    (CN) .......................... 202011090561.7

(51) Int. Cl.
| | | |
|---|---|---|
| C08L 9/00 | (2006.01) | |
| B60C 1/00 | (2006.01) | |
| C08K 3/04 | (2006.01) | |
| C08K 5/3437 | (2006.01) | |
| C08K 13/02 | (2006.01) | |
| C08L 7/00 | (2006.01) | |

(52) U.S. Cl.
CPC ............. C08L 9/00 (2013.01); C08K 5/3437 (2013.01); C08K 13/02 (2013.01); C08L 7/00 (2013.01); B60C 1/00 (2013.01); C08K 3/04 (2013.01); C08L 2201/08 (2013.01); C08L 2205/03 (2013.01); C08L 2312/00 (2013.01)

(58) Field of Classification Search
CPC .......... C08L 9/00; C08L 7/00; C08L 2201/08; C08L 2312/00; C08L 2205/03; B60C 1/00
See application file for complete search history.

(56) References Cited

U.S. PATENT DOCUMENTS

2010/0036057 A1*    2/2010    Mori ....................... C08L 15/00
525/192

FOREIGN PATENT DOCUMENTS

| | | | |
|---|---|---|---|
| CN | 102114432 A | 7/2011 | |
| CN | 102850610 A | 1/2013 | |
| CN | 103012869 A | 4/2013 | |
| CN | 104017122 A | 9/2014 | |
| CN | 107118405 A | * 9/2017 | |
| CN | 108623855 A | 10/2018 | |
| CN | 109810300 A | 5/2019 | |
| CN | 110330699 A | 10/2019 | |
| CN | 110358155 A | * 10/2019 | |
| CN | 111686726 A | 9/2020 | |
| CN | 113372623 A | 9/2021 | |
| JP | 2005232355 A | * 9/2005 | |
| WO | WO-2019088986 A1 | * 5/2019 | ............... B60C 1/00 |

OTHER PUBLICATIONS https://wap.guidechem.com/trade/n-1-3-dimethylbutyl-n-phenyl-p-id4671401.html (pdf attached).*
https://www.fishersci.com/shop/products/n-1-3-dimethylbutyl-n-phenyl-1-4-phenylenediamine-tci-america-2/D333125G (pdf attached).*
N-(1,3-Dimethylbutyl)-N'-phenyl-p-phenylenediamine (cas 793-24-8) SDS/MSDS, Guidechem, Creation date Aug. 12, 2017 (Year: 2017).*

* cited by examiner

*Primary Examiner* — Marc S Zimmer
*Assistant Examiner* — Surbhi M Du
(74) *Attorney, Agent, or Firm* — Mei & Mark LLP; Manni Li

(57) ABSTRACT

A formulation for rubber composition with reduced odor and good thermal oxidative aging-resistance and tension fatigue resistance comprising 100 parts by weight of a diene elastomer, 30 to 70 parts by weight of a reinforcing filler, 0.1 to 8 parts by weight of an antidegradant composition, and 0.5 to 3 parts by weight of a crosslinker, wherein the antidegradant composition includes a 6PPD antidegradant with a purity of equal to or greater than about 98% and an S-TMQ. The rubber composition has no added odor inhibitor/adsorbent or deodorizing additive, while by using combination of 6PPD with purity of equal to or greater than about 98% and an S-TMQ instead of traditional combination of 6PPD and a TMQ, the VOC emission of the rubber composition is effectively reduced, the odor grade is reduced, and the thermal oxidative aging-resistance and tension fatigue resistance is improved.

20 Claims, No Drawings

RUBBER COMPOSITION WITH REDUCED ODOR AND GOOD THERMAL OXIDATIVE AGING-RESISTANT AND ANTI-FATIGUE PROPERTIES

CROSS-REFERENCE TO RELATED APPLICATIONS

The subject application claims priority to Chinese Patent Application No. 202011090561.7 filed on Oct. 13, 2020, in China. The Chinese priority application is incorporated herein by reference.

TECHNICAL FIELD

The present invention relates to rubber composition, particularly, formulation for rubber composition with reduced odor and good thermal oxidative aging-resistance and anti-fatigue properties.

BACKGROUND ART

A tire is not an ornament for a car, but a spare tire is stored in the trunk of a passenger vehicle, which sends out smell that causes discomfort and even affects the health and safety of the passenger in the vehicle.

As people become more aware about the environmental protection, health, and safety annually, they become more sensitive and concerned about the smell in the car. More and more major automobile engine manufacturers require that the spare tire be tested and controlled for volatile organic compounds (VOC), which necessitates the need to reduce the odor of the tire.

A variety of additives and materials, such as vulcanizing agent, promoter, antidegradant, etc., are added to the rubber composition during the processing. Complex chemical reactions occur during the vulcanization of the rubber composition, resulting in volatile organic compounds and odorous and discomforting small molecular gases. Most of these substances are discharged after rubber vulcanization, however, a small portion of the gases remains in the rubber article and is gradually released over time. Antidegradants, especially p-phenylenediamine antidegradants, such as N-(1,3-dimethylbutyl)-N'-phenyl p-phenylenediamine (6PPD), are widely used in various parts of tires due to its excellent anti-aging effect. Even though in small amount, 4-methyl-2-pentanone (MIBK) and aniline remained in the volatiles of the antidegradants are irritating, and thus, are considered to be one of the major source for the tire odor.

Currently, methods used to improve the tire odor mainly include (1) adding additives with aromatic smell or physical adsorbents to the tire formula to improve the odor, but the method only covers or adsorbs the odor and does not fundamentally reduce the VOC emission; and (2) adding deodorizing additives, i.e., physical deodorizing agents, such as polyethylene glycol, to the tire formula to accelerate the discharge of the small molecular gases generated during rubber processing (mixing and vulcanization) to reduce the release during the subsequent storage. The method is disadvantageous as it increases the VOC emission of the factory and health risk of the operator.

On the other hand, good thermal oxidative aging-resistance and tension fatigue resistance are important properties pursued in the field of the rubber composition. Therefore, there is still a need in the art for a low-odor rubber composition with reduced VOC emission and good thermal oxidative aging-resistance and tension fatigue resistance.

SUMMARY OF INVENTION

To solve the problem, the present invention provides a formulation for rubber composition with reduced odor and good thermal oxidative aging-resistance and tension fatigue resistance which does not add any odor inhibitor/adsorbent or deodorizing additive. By adjusting the combination of the antidegradants in the formulation, that is, replacing the conventional combination of 6PPD antidegradant and TMQ (a quinoline antidegradant that is a polymer of 1,2-dihydro-2,2,4-trimethylquinoline, CAS No. 26780-96-1, herein referred to as TMQ or TMQ antidegradant) with a combination of a specific 6PPD antidegradant and a specific quinoline antidegradant (also a polymer of 1,2-dihydro-2,2,4-trimethylquinoline, CAS No. 26780-96-1, herein referred to as S-TMQ or S-TMQ antidegradant), the present invention achieves effective reduction of the VOC emission and odor grade and improvement on the thermal oxidative aging-resistance and tension fatigue resistance.

Specifically, the present invention provides a formulation for rubber composition comprising 100 parts by weight of a diene elastomer, 30 to 70 parts by weight of a reinforcing filler, 0.1 to 8 parts by weight of an antidegradant composition, and 0.5 to 3 parts by weight of a crosslinker, wherein the antidegradant composition comprises a 6PPD antidegradant with a purity that is equal to or greater than about 98% mass percentage and an S-TMQ antidegradant that is a TMQ antidegradant with the total amount of dimer, trimer, and tetramer of 1,2-dihydro-2,2,4-trimethylquinoline equal to or greater than 80% mass percentage.

The formulation for the rubber composition of the present invention comprises a mixture of components that are generally referred to as the raw materials. Based on the formulation of the present invention, one of skilled in the art may obtain both vulcanized or unvulcanized rubber and further process them into rubber articles.

In one or more embodiments of the present invention, the purity of the 6PPD antidegradant is equal to or greater than 98.5% mass percentage.

In one or more embodiments of the present invention, the number of varieties of the organic volatiles in the 6PPD antidegradant is no more than 5.

In one or more embodiments of the present invention, the total amount of the organic volatiles in the 6PPD antidegradant is equal to or less than 10% mass percentage of the total amount of the organic volatiles in a 6PPD antidegradant with a purity of 97%.

In one or more embodiments of the present invention, the amount of 4-methyl-2-pentanone in the 6PPD antidegradant is equal to or less than 12% mass percentage of the amount of 4-methyl-2-pentanone in a 6PPD antidegradant with a purity of 97%.

In one or more embodiments of the present invention, the amount of aniline in the 6PPD antidegradant does not exceed 6.2% mass percentage of the amount of aniline in a 6PPD antidegradant with a purity of 97%.

In one or more embodiments of the present invention, the total amount of dimer, trimer and tetramer of 1,2-dihydro-2,2,4-trimethylquinoline in the S-TMQ antidegradant is equal to or greater than 80.2% mass percentage.

In one or more embodiments of the present invention, the number of varieties of the organic volatiles in the S-TMQ antidegradant is no more than 8.

In one or more embodiments of the present invention, the total amount of organic volatiles in the S-TMQ is equal to or less than 41.7% mass percentage of the total amount of the organic volatiles in a TMQ antidegradant with a total amount of dimer, trimer, and tetramer of 1,2-dihydro-2,2,4-trimethylquinoline of 51% mass percentage.

In one or more embodiments of the present invention, the amount of acetone in the S-TMQ is equal to or less than 20.5% mass percentage of the amount of acetone in a TMQ antidegradant with a total amount of dimer, trimer, and tetramer of 1,2-dihydro-2,2,4-trimethylquinoline of 51% mass percentage.

In one or more embodiments of the present invention, the amount of aniline in the S-TMQ is equal to or less than 27.3% mass percentage of the amount of aniline in a TMQ antidegradant with a total amount of dimer, trimer, and tetramer of 1,2-dihydro-2,2,4-trimethylquinoline of 51% mass percentage.

In one or more embodiments of the present invention, the amount of 1,2-dihydro-2,2,4-trimethylquinoline monomers in the S-TMQ is equal to or less than 64.8% mass percentage of the amount of the 1,2-dihydro-2,2,4-trimethylquinoline monomers in a TMQ antidegradant with a total amount of dimer, trimer, and tetramer of 1,2-dihydro-2,2,4-trimethylquinoline of 51% mass percentage.

In one or more embodiments of the present invention, the mass ratio of the 6PPD antidegradant to the S-TMQ antidegradant in the antidegradant composition of the formulation for the rubber composition of the present invention is 1:0.2 to 1:1, and preferably 1:0.36 to 1:0.6.

In one or more embodiments of the present invention, based on 100 parts by weight of the diene elastomer, the formulation comprises 2 to 5 parts by weight, and preferably 3.4 to 4 parts by weight, of the antidegradant composition.

In one or more embodiments of the present invention, the antidegradant composition consists of the 6PPD antidegradant with a purity of equal to or greater than about 98% mass percentage and the S-TMQ.

In one or more embodiments of the present invention, the diene elastomer comprises one or more selected from natural rubber, butadiene rubber, isoprene rubber, styrene butadiene rubber, chloroprene rubber, nitrile rubber, isoprene/butadiene copolymer, isoprene/styrene copolymer, and isoprene/butadiene/styrene copolymer. Preferably, the diene elastomer comprises natural rubber and butadiene rubber, and the mass ratio of the natural rubber to the butadiene rubber is 4:6 to 6:4.

In one or more embodiments of the present invention, the reinforcing filler comprises one or more selected from carbon black, titanium oxide, magnesium oxide, calcium carbonate, magnesium carbonate, aluminum hydroxide, magnesium hydroxide, clay, and talc. Preferably, the reinforcing filler is carbon black.

In one or more embodiments of the present invention, the crosslinker is sulfur.

In one or more embodiments of the present invention, the formulation further comprises one or more selected from softeners, activators, and promoters.

In one or more embodiments of the present invention, the formulation of the rubber composition comprises 100 parts by weight of a diene elastomer, 40 to 60 parts by weight of carbon black, 1 to 2 parts by weight of sulfur, 2 to 3 parts by weight of a 6PPD antidegradant with a purity of equal to or greater than about 98% mass percentage, 0.5 to 2 parts by weight of an S-TMQ, 2 to 8 parts by weight of zinc oxide, 1 to 3 parts by weight of stearic acid, 1 to 10 parts by weight of naphthenic oil, and 0.5 to 1.5 parts by weight of a promoter, wherein the diene elastomer comprises a natural rubber and a butadiene rubber with a mass ratio of from 4:6 to 6:4.

The present invention also provides a rubber article comprising the rubber composition prepared from the formulation for the rubber composition according to the embodiments as described herein. The rubber composition may be vulcanized or unvulcanized. Preferably, the rubber article is a tire.

The present invention also provides a method of use of the 6PPD antidegradant with a purity of equal to or greater than about 98% mass percentage and an S-TMQ in improving odor of a rubber composition or a rubber article, thermal oxidative aging-resistance, tension fatigue resistance of a rubber composition or a rubber article, or a combination thereof, wherein the S-TMQ is a TMQ antidegradant with a total amount of dimer, trimer, and tetramer of 1,2-dihydro-2,2,4-trimethylquinoline equal to or greater than 80% mass percentage. Preferably, the rubber article is a tire. Preferably, the 6PPD antidegradant with a purity equal to or greater than about 98% mass percentage is as described in the embodiments herein. Preferably, the S-TMQ is as described in the embodiments herein.

DETAILED DESCRIPTION OF INVENTION

The present invention is further described in connection with the following examples. The examples do not limit the scope of protection for the present invention, and technical features disclosed therein may be modified or combined without departing from the scope of the present invention.

Unless otherwise specified, a percentage refers to mass percentage, and a ratio refers to mass ratio in the present invention.

The present invention provides the use of the combination of a 6PPD antidegradant with a purity of equal to or greater than about 98% and an S-TMQ in the rubber compositions, instead of the combination of a 6PPD antidegradant with lower purity and a TMQ antidegradant, as the antidegradants, which significantly improve the odor of rubber without adding an odor inhibitor/adsorbent or deodorizing additive. Further, the present invention provides that, compared with the combination of a 6PPD antidegradant with lower purity and a TMQ antidegradant, the use of the combination of a 6PPD antidegradant with a purity of equal to or greater than about 98% mass percentage and an S-TMQ in rubber compositions can not only significantly improve the odor of rubber, but also improve the thermal oxidative aging-resistance and tension fatigue resistance of the rubber composition with less amount of antidegradant, and maintain good original tensile strength, original elongation at break, static ozone aging-resistance, and dynamic ozone aging-resistance.

In the present invention, an S-TMQ refers to a TMQ (1,2-dihydro-2,2,4-trimethylquinoline polymer) antidegradant with a total amount of dimer, trimer, and tetramer of 1,2-dihydro-2,2,4-trimethylquinoline equal to or greater than 80%. A 6PPD antidegradant has the meaning well known in the art and refers to an antidegradant whose main component is 6PPD. A TMQ antidegradant has the meaning well known in the art and refers to an antidegradant whose main component is TMQ.

In some embodiments of the present invention, the 6PPD antidegradant with a purity of equal to or greater than about 98% has one or more of the following features: the purity is equal to or greater than 98.5%; the number of types of organic volatiles in the 6PPD antidegradant is no more than 5; the total amount of the organic volatiles in the 6PPD antidegradant is equal to or less than 10% of the total amount of the organic volatiles in a 6PPD antidegradant with a purity of 97%; the amount of 4-methyl-2-pentanone in the 6PPD antidegradant is equal to or less than 12% of the amount of 4-methyl-2-pentanone in the 6PPD antidegradant with the purity of 97%; and the amount of aniline in the 6PPD antidegradant is equal to or less than 6.2% of the amount of aniline in the 6PPD antidegradant with the purity of 97%.

In some embodiments of the present invention, the S-TMQ used in the present invention has one or more of the following features: the total amount of dimer, trimer, and tetramer of 1,2-dihydro-2,2,4-trimethylquinoline of the S-TMQ is equal to or greater than 80.2%; the number of types of the organic volatiles in the S-TMQ is no more than 8; the total amount of the organic volatiles in the S-TMQ is equal to or less than 41.7% of the total amount of the organic volatiles in a TMQ antidegradant with a total amount of dimer, trimer, and tetramer of 1,2-dihydro-2,2,4-trimethylquinoline of 51%; the amount of acetone in the S-TMQ is equal to or less than 20.5% of the amount of acetone in the TMQ antidegradant with the total amount of dimer, trimer, and tetramer of 1,2-dihydro-2,2,4-trimethylquinoline of 51%; the amount of aniline in the S-TMQ is equal to or less than 27.3% of the amount of aniline in the TMQ antidegradant with the total amount of dimer, trimer, and tetramer of 1,2-dihydro-2,2,4-trimethylquinoline of 51%; the amount of the 1,2-dihydro-2,2,4-trimethylquinoline monomers in the S-TMQ is equal to or less than 64.8% of the amount of the 1,2-dihydro-2,2,4-trimethylquinoline monomers in the TMQ antidegradant with the total amount of dimer, trimer, and tetramer of 1,2-dihydro-2,2,4-trimethylquinoline of 51%.

The formulation for rubber compositions generally comprises a diene elastomer, a reinforcing filler, an antidegradant, and a crosslinker. Herein, rubber compositions includes unvulcanized rubbers and vulcanized rubbers. Vulcanized rubbers can be prepared from unvulcanized rubbers after vulcanization (curing).

The rubber composition of the present invention comprises a diene elastomer, a reinforcing filler, an antidegradant, and a crosslinker, wherein, based on 100 parts by weight of the diene elastomer, the amount of the reinforcing filler is 30 to 70 parts by weight, the amount of the antidegradant composition is 0.1 to 8 parts by weight, and the amount of the crosslinker is 0.5 to 3 parts by weight, and the antidegradant composition comprises a 6PPD antidegradant with a purity equal to or greater than about 98% and an S-TMQ. Herein, unless otherwise specified, part by weight is based on 100 parts by weight of the diene elastomer in the formulation of the rubber composition.

Herein, a diene elastomer refers to an elastomer with its monomers comprising dienes (such as butadiene and isoprene). Diene elastomers suitable for use in the present invention are known in the field, including but not limited to one or more selected from natural rubber (NR), butadiene rubber (BR), isoprene rubber, styrene butadiene rubber (SBR), chloroprene rubber (CR), nitrile butadiene rubber (NBR), isoprene/butadiene copolymer, isoprene/styrene copolymer, and isoprene/butadiene/styrene copolymer. In some embodiments, in the formulation for the rubber composition of the present invention, the diene elastomer comprises natural rubber and butadiene rubber, or consists of natural rubber and butadiene rubber; and the mass ratio of the natural rubber to the butadiene rubber may be in the ranges of 1:9 to 9:1; 2:8 to 8:2; 3:7 to 7:3; 4:6 to 6:4; 4.5:5.5 to 5.5:4.5; or 1:1. Examples of natural rubber include the first grade standard rubber in the Chinese national standard GB/T 8081-2008 (generally referred to as SCR5). Examples of butadiene rubber include butadine rubber conforming to the Chinese national standard GB/T 8659-2018 (generally referred to as BR9000). Both national standards are incorporated herein by reference.

The formulation of the rubber composition of the present invention generally comprises 0.1 to 8 parts by weight, preferably 2 to 5 parts by weight, more preferably 3 to 4.5 parts by weight, more preferably 3.4 to 4 parts by weight of the antidegradant composition. The formulation of the rubber composition of the present invention is characterized in that the antidegradant composition comprises a 6PPD antidegradant with a purity equal to or greater than about 98% and an S-TMQ. In one or more embodiments of the present invention, the antidegradant composition consists of the 6PPD antidegradant with the purity equal to or greater than about 98% and the S-TMQ. Generally, in the antidegradant composition, the mass ratio of the 6PPD antidegradant to the S-TMQ is 1:0.2 to 1:1, preferably 1:0.3 to 1:0.8, more preferably 1:0.36 to 1:0.6. The present invention provides that, through controlling the mass ratio of the 6PPD antidegradant to the S-TMQ to be in the disclosed ranges, the odor of rubber can be significantly improved, the thermal oxidative aging-resistance and tension fatigue resistance of the rubber composition can be improved, and good original tensile strength, original elongation at break, static ozone aging-resistance, and dynamic ozone aging-resistance can be maintained. Generally, in the rubber composition of the present invention, the 6PPD antidegradant with the purity equal to or greater than about 98% is used in an amount of 0.1 to 4 parts by weight, preferably 1 to 4 parts by weight, more preferably 2 to 3 parts by weight, for example, 2.2 to 2.8 parts by weight, 2.5±0.2 parts by weight, 2.5±0.1 parts by weight. Generally, in the rubber composition of the present invention, the S-TMQ is used in an amount of 0.1 to 4 parts by weight, preferably 0.5 to 3 parts by weight, more preferably 0.5 to 2 parts by weight, for example, 0.6 to 1.8 parts by weight, 0.8 to 1.6 parts by weight, 0.9 parts by weight, 1.0 parts by weight, 1.2 parts by weight, 1.5 parts by weight. The present invention provides that when the formulation of the rubber composition comprises a 6PPD antidegradant with purity equal to or greater than about 98% and an S-TMQ with the above parts by weight, the rubber composition prepared therefrom has significantly improved odor, improved thermal oxidative aging-resistance and tension fatigue resistance, and good original tensile strength, original elongation at break, static ozone aging-resistance, and dynamic ozone aging-resistance.

Reinforcing fillers suitable for use in the present invention may be those conventionally used for rubber compositions, including but not limited to one or more selected from carbon black, titanium oxide, magnesium oxide, calcium carbonate, magnesium carbonate, aluminum hydroxide, magnesium hydroxide, clay, and talc. In some embodiments of the rubber composition of the present invention, the reinforcing filler is carbon black. Generally, the formulation of the rubber composition comprises 30 to 70 parts by weight, preferably 40 to 60 parts by weight, more preferably 45 to 55 parts by weight, of a reinforcing filler. In some embodiment, the formulation of the rubber composition of the present invention comprises 30 to 70 parts by weight, preferably 40 to 60 parts by weight, more preferably 45 to 55 parts by weight, such as 50±2 parts by weight, of carbon black.

A crosslinker may be sulfur. Generally, the formulation of the rubber composition comprises 0.5 to 3 parts by weight, preferably 1 to 3 parts by weight, more preferably 1 to 2 parts by weight of a crosslinker. In some embodiment, the formulation of the rubber composition of the present invention comprises 0.5 to 3 parts by weight, preferably 1 to 3 parts by weight, more preferably 1 to 2 parts by weight, such as 1.5±0.2 parts by weight or 1.5±0.1 parts by weight of the crosslinker.

The formulation of the rubber composition of the present invention may also comprise other components conventionally used in the rubber composition, including but not limited to one or more of aids and promoters. The amounts of aids and promoters can be conventional amounts in the art.

Aids may include softeners used to improve processability and other properties. Softeners may include petroleum softeners (operating oil), such as naphthenic oil, aromatic oil, processing oil, lubricating oil, paraffin, liquid paraffin, petroleum asphalt, and vaseline, etc., and/or fatty oil softeners, such as stearic acid, castor oil, flaxseed oil, rapeseed oil, coconut oil, wax (e.g., beewax, carnauba wax, and lanolin), tall oil, linoleic acid, palmitic acid, and lauric acid, etc. Aids may also include activators, such as zinc oxide, which can speed up the vulcanization rate and improve the thermal conductivity, wear resistance, and tear resistance of rubber. Generally, aids are used in an amount of 2 to 20 parts by weight per 100 parts by weight of diene elastomer. In some embodiments, the formulation of the rubber composition of the present invention comprises an operating oil, such as naphthenic oil. The formulation of the rubber composition of the present invention may comprise 0 to 20 parts by weight, preferably 1 to 10 parts by weight, more preferably 2 to 8 parts by weight, such as 5±2 parts by weight or 5±1 parts by weight of an operating oil, such as naphthenic oil. In some embodiments, the formulation of the rubber composition of the present invention comprises a fatty oil softener, such as stearic acid. The formulation of the rubber composition of the present invention may comprise 0 to 5 parts by weight, preferably 0.5 to 4 parts by weight, more preferably 1 to 3 parts by weight, such as 2±0.5 parts by weight or 2±0.2 parts by weight, of a fatty oil softener, such as stearic acid. In some embodiments, the formulation of the rubber composition of the present invention comprises an activator, such as zinc oxide. The formulation of the rubber composition of the present invention may comprise 0 to 10 parts by weight, preferably 2 to 8 parts by weight, more preferably 3 to 7 parts by weight, such as 5±1 parts by weight, of an activator, such as zinc oxide. In some embodiments, the formulation of the rubber composition of the present invention comprises an operating oil, a fatty oil softener, and an activator. The amounts of the operating oil, the fatty oil softener, and the activator are as described above, respectively.

Promoters are generally vulcanization accelerators, which may be selected from one or more of sulfonamide, thiazole, thiuram, thiourea, guanidine, dithiocarbamate, aldimine, aldehyde ammonia, imidazoline, and xanthic acid vulcanization accelerators. For example, the promoter may be N-cyclohexylbenzothiazole-2-sulphenamide (CBS). In some embodiments, the formulation of the rubber composition of the present invention comprises a promoter, such as CBS. The formulation of the rubber composition of the present invention may comprise 0 to 1.5 parts by weight, preferably 0.5 to 1.5 parts by weight, more preferably 0.5 to 1.2 parts by weight, such as 0.8±0.2 parts by weight or 0.8±0.1 parts by weight, of a promoter, such as CBS.

In addition, when necessary, a plasticizer may be used in the rubber composition of the present invention, for examples, dimethyl phthalate (DMP), diethyl phthalate (DEP), dibutyl phthalate (DBP), diheptyl phthalate (DHP), dioctyl phthalate (DOP), di-isononyl phthalate (DINP), di-isodecyl phthalate (DIDP), butyl benzyl phthalate (BBP), dilauryl phthalate (DWP), and dicyclohexyl phthalate (DCHP), etc. The plasticizer may be used in a conventional amount that is known in the art.

In some preferred embodiments, the formulation of the rubber composition of the present invention comprises: 100 parts by weight of a diene elastomer; 40 to 60 parts by weight, preferably 45 to 55 parts by weight of a reinforcing filler, 1 to 3 parts by weight, preferably 1 to 2 parts by weight of sulfur, 2 to 5 parts by weight, preferably 3 to 4.5 parts by weight, more preferably 3.4 to 4 parts by weight of an antidegradant composition, 2 to 8 parts by weight, preferably 3 to 7 parts by weight of an activator, 0.5 to 4 parts by weight, preferably 1 to 3 parts by weight of a fatty oil softener, 1 to 10 parts by weight, preferably 2 to 8 parts by weight of an operating oil and 0.5 to 1.5 parts by weight, preferably 0.5 to 1.2 parts by weight of a promoter; wherein the diene elastomer preferably comprises natural rubber and butadiene rubber with a mass ratio of from 4:6 to 6:4, preferably from 4.5:5.5 to 5.5:4.5; the reinforcing filler is preferably carbon black; the antidegradant composition comprises a 6PPD antidegradant with a purity equal to or greater than about 98% mass percentage and an S-TMQ or consists of the 6PPD antidegradant with the purity equal to or greater than about 98% mass percentage and the S-TMQ; preferably, the mass ratio of the 6PPD antidegradant to the S-TMQ is 1:0.2 to 1:1, preferably 1:0.3 to 1:0.8, more preferably 1:0.36 to 1:0.6; preferably, the formulation of the rubber composition comprises 1 to 4 parts by weight, preferably 2 to 3 parts by weight, of the 6PPD antidegradant with purity ≥about 98% mass percentage, and 0.5 to 3 parts by weight, preferably 0.5 to 2 parts by weight of the S-TMQ; the activator is preferably zinc oxide; the fatty oil softener is preferably stearic acid; the operating oil is preferably naphthenic oil; and the promoter is preferably CBS promoter.

The unvulcanized rubber of the present invention can be prepared by a conventional rubber mixing method, such as two-stage mixing method: in the first stage, an internal mixer is used to mix diene elastomers, reinforcing fillers, aids and antidegradants, and the rubber discharge temperature is 110° C. or higher; in the second stage, an open mill is used to mix the rubber obtained in the first stage with crosslinkers and promoters. Generally, a diene elastomer is added into a thermo-mechanical mixer (such as an internal mixer) at first. After kneading for a while, a reinforcing filler, an aid, and an antidegradant composition are added to the diene elastomer and the mixture is kept on being kneaded until the mixture is homogeneous. The reinforcing filler, the aid, and the antidegradant composition may be added in batches. The temperature during kneading is controlled to between 110° C. and 190° C., preferably between 150° C. and 160° C. Then, the mixture is cooled to 100° C. or lower. A crosslinker and a promoter are added to the mixture and a second kneading is performed during which the temperature is controlled to 110° C. or lower, such as 70±5° C., and an unvulcanized rubber is obtained.

The unvulcanized rubber of the present invention can be vulcanized by a conventional vulcanization method to obtain a vulcanized rubber. The vulcanization temperature is generally 130° C. to 200° C., such as 140° C. to 150° C. or 145±2° C. The vulcanization time depends on the vulcanization temperature, vulcanization system, and vulcanization kinetics, and is generally 15-60 minutes, such as 20-30 minutes or 25±2 minutes. Conventional tablet pressing can be carried out on the kneaded unvulcanized rubber before vulcanization.

In some embodiments, the rubber composition of the present invention is prepared by the following method:

(1) Mixing diene elastomers, reinforcing fillers, aids, and antidegradants uniformly with a thermomechanical mixer (such as an internal mixer), preferably with a rubber discharge temperature of 110° C. or higher, such as 140° C. or higher;

(2) Mixing the rubber obtained in step (1), vulcanizing agents, and promoters uniformly with a thermomechanical mixer (such as an open mill), preferably with a tablet discharge temperature of 110° C. or lower, such as 70±5° C., to obtain an unvulcanized rubber.

In some embodiments, the method for preparing the rubber composition of the present invention further comprises: (3) After optionally pressing the unvulcanized rubber, vulcanizing the unvulcanized rubber to obtain a vulcanized rubber. Preferably, the vulcanization temperature is 130° C. to 200° C., such as 140° C. to 150° C. Preferably, the vulcanization time is 15 to 60 minutes, such as 20 to 30 minutes.

Compared with rubber compositions comprising the combination of a 6PPD antidegradant with lower purity and a TMQ antidegradant, the use of the rubber composition of the present invention in rubber articles, especially rubber tires, can not only significantly improve the odor of rubber articles, but also improve the thermal oxidative aging-resistance and tension fatigue resistance of rubber articles with less amount of antidegradants, and maintain good original tensile strength, original elongation at break, static ozone aging-resistance, and dynamic ozone aging-resistance.

Therefore, the present invention also provides a rubber article comprising the rubber composition described herein. The rubber article may be a tire, a rubber overshoe, a sealing strip, an acoustic panel, or a crash pad, etc. In some embodiments, the rubber article is a tire, such as a tread, a belt ply, and a sidewall of a tire. As a belt ply of a tire, the rubber article may further comprise a reinforcing material conventionally used in the art in addition to the rubber composition of the present invention. The present invention further provides use of a 6PPD antidegradant with purity equal to or greater than about 98% and an S-TMQ in improving the odor of a rubber composition or a rubber article or in improving the thermal oxidative aging-resistance and/or tension fatigue resistance of a rubber composition or a rubber article. In the use of the present invention, the preferred 6PPD antidegradant with purity ≥about 98% mass percentage, the preferred S-TMQ and the dosage ratio of the two are as described in the embodiments.

The present invention will be illustrated by way of specific examples below. It should be understood that these examples are merely explanatory and is not intended to limit the scope of the present invention. Unless otherwise specified, the methods, reagents, and materials used in the examples are conventional methods, reagents, and materials in the art. The formulations used in the examples are commercially available.

The sources of the raw materials and materials used in the preparation examples and testing Examples are as follows:
NR: Xishuangbanna Sinochem Rubber Co., Ltd., SCR5;
BR9000: Nanjing Yangzi Petrochemical Rubber Co., Ltd., synthetic rubber BR9000;
N550: Cabot Corporation, carbon black N550;
Zinc oxide: Shanghai Titan Scientific Co., Ltd., General reagent, zinc oxide (AR);
Stearic acid: Shanghai Titan Scientific Co., Ltd., General reagent, stearic acid (AR);
Naphthenic oil: Maoming Runhua Petrochemical Co., Ltd., naphthenic oil KN4010;
6PPD antidegradant 1: Sennics Co., Ltd., the purity is 97.0% as commercially available on the market;
TMQ antidegradant: Sennics Co., Ltd. as commercially available on the market;
6PPD antidegradant 2: Sennics Co., Ltd., the purity is 98.5%;
S-TMQ: Kemai Chemical Co., Ltd.;
CBS: Shandong Yanggu Huatai Chemical Co., Ltd.;
S: Sinopharm Chemical Reagent Co. Ltd., Sublimated sulfur (AR).

Preparation Examples 1-4: Preparation of Vulcanized Rubber Film

Rubber compositions of Examples 1-4 and Comparative Example are prepared by laboratory mixing process and two-stage mixing method from the formulations as shown in Table 1 using the following particular steps:
1. first stage of internal mixer mixing: a nature rubber (NR), a synthetic rubber BR9000, carbon black N550, zinc oxide, stearic acid (SA), naphthenic oil, and antidegradants (6PPD antidegradant 1 and a TMQ antidegradant, or 6PPD antidegradant 2 and an S-TMQ) are added into an internal mixer, the mixture is mixed uniformly, and the rubber discharge temperature Ss 140° C.;
2. second stage of open mill mixing: the rubber obtained in the first stage, sulfur (S), and promoter CBS are added into an open mill, the mixture is mixed uniformly, and the film discharge temperature is 70° C.;
3. vulcanization: the rubber obtained by two-stage mixing is calendered into a film with a thickness of 2 mm, and vulcanized at 145° C. for 25 min to obtain a vulcanized rubber film.

Each vulcanized film is cut into rubber particles with a size of about 2 mm*2 mm*2 mm for subsequent odor evaluation and VOC analysis.

TABLE 1

| | Formulation of Rubber Composition (unit: parts by mass) | | | | |
|---|---|---|---|---|---|
| Material | Comparative Example | Example 1 | Example 2 | Example 3 | Example 4 |
| NR | 50 | 50 | 50 | 50 | 50 |
| BR9000 | 50 | 50 | 50 | 50 | 50 |
| N550 | 50 | 50 | 50 | 50 | 50 |
| ZnO | 5 | 5 | 5 | 5 | 5 |

TABLE 1-continued

Formulation of Rubber Composition (unit: parts by mass)

| Material | Comparative Example | Example 1 | Example 2 | Example 3 | Example 4 |
|---|---|---|---|---|---|
| SA | 2 | 2 | 2 | 2 | 2 |
| Naphthenic oil | 5 | 5 | 5 | 5 | 5 |
| 6PPD antidegradant 1 | 2.5 | | | | |
| TMQ antidegradant | 1.5 | | | | |
| 6PPD antidegradant 2 | | 2.5 | 2.5 | 2.5 | 2.5 |
| S-TMQ | | 1.5 | 1.2 | 1.0 | 0.9 |
| CBS | 0.8 | 0.8 | 0.8 | 0.8 | 0.8 |
| S | 1.5 | 1.5 | 1.5 | 1.5 | 1.5 |
| Total | 168.3 | 168.3 | 168.0 | 167.8 | 167.7 |

Test Example 1: Odor Evaluation

The odor grade of the vulcanized rubber films of Examples 1-4 and Comparative Example are evaluated according to the public odor detection standard VW 50180. The specific method is as follows:

The odor grade of vulcanized rubber films is evaluated under normal temperature and high temperature according to the odor grading standard in Table 2:

a. a 20 g sample is put into a 1 L odor bottle, the bottle is placed for 24 hrs at normal temperature, and the odor is evaluated;

b. a 20 g sample is put into a 1 L odor bottle, the bottle is placed at 80° C. for 2 hrs and then cooled to room temperature, and the odor is evaluated.

Each evaluation is conducted by 5 people, respectively, and the subjective evaluation method is adopted. As shown in Table 2, the odor intensity is divided into 6 grades, from grade 1 to grade 6, corresponding to being imperceptible to intolerable. The average value of the evaluation results of 5 people is taken to distinguish and compare the odor intensity of the samples. The results are shown in Table 3.

Test Example 2: Rubber Film VOC Analysis

The volatile substances in the vulcanized rubber films of Examples 1-4 and Comparative Example are qualitatively analyzed by headspace gas chromatography-mass spectrometry (HS-GC MS), and the same high temperature condition (80° C.×2 hrs) as the odor evaluation of Test Example 1 is adopted for sample injection. The obtained spectra are compared with the standard spectra of NIST library to determine the volatile substances, and the amount of each substance is determined by area normalization method. The test conditions are as follows: HS: 80° C., 120 min; GC-MS capillary column: HP-5MS (30 m×0.25 mm×0.25 μm); Process: maintain at 60° C. for 2 min, raise the temperature to 280° C. at a heating rate of 10° C.·min$^{-1}$ and maintain for 2 min, and raise the temperature to 300° C. at a heating rate of 10° C.·min$^{-1}$ and maintain for 2 min. The VOC analysis results of vulcanized rubber films are shown in Table 3.

TABLE 3

Results of odor evaluation and VOC analysis of vulcanized rubber films

| | Comparative Example | Example 1 | Example 2 | Example 3 | Example 4 |
|---|---|---|---|---|---|
| Odor grade (Normal temperature for 24 hrs) | 3.7 | 3.1 | 3.0 | 2.8 | 2.6 |
| Odor grade (80° C. for 2 hrs, and then room temperature) | 4.0 | 3.3 | 3.3 | 3.2 | 3.0 |
| Total VOC % (Comparative Example as benchmark) | 100.0 | 83.1 | 80.3 | 77.5 | 71.3 |

TABLE 2

Grade Standard for Odor

| Grade | Odor description |
|---|---|
| 1 | No odor |
| 2 | Slight odor (almost unrecognizable odor) |
| 3 | Easily recognizable odor, but there is no discomfort |
| 4 | Obvious odor, uncomfortable |
| 5 | Strong odor, disgusting |
| 6 | Unbearable odor |

The evaluation results of odor grade in Table 3 show that the odor of the rubber mixed with the combination of 6PPD antidegradant 2/S-TMQ (Examples 1-4) is lower than that of the rubber mixed with the combination of 6PPD antidegradant 1/TMQ antidegradant (Comparative Example), no matter under normal temperature or high temperature. The odor grade of the example rubber under normal temperature does not exceed grade 3.1, which means only slight odor existed. Under high temperature, the odor grade of the example rubber does not exceed grade 3.3, which means there was no discomfort, while the corresponding rubber of Comparative Example released an uncomfortable odor, with the odor grade reaching grade 4.

Test Example 3: Physical and Mechanical Properties and Anti-Aging Properties Under the standard laboratory environment, the physical and mechanical properties and aging properties such as thermal oxidative resistance, ozone resistance, and tension fatigue resistance of vulcanized rubber films of Examples 1-4 and Comparative Example are tested according to the following rubber test standards, and the test results are shown in Table 4:

Tensile strength and elongation at break: GB/T 528-2009 Rubber, vulcanized or thermoplastic—Determination of tensile stress-strain properties;

GB/T 3512-2001 Rubber, vulcanized or thermoplastic—Accelerated aging and heat resistance tests—Air-oven method;

Static ozone aging-resistance: GB/T 7762-2014 Rubber, vulcanized or thermoplastic—Resistance to ozone cracking—Static strain testing—method A;

Dynamic ozone aging-resistance: GB/T 13642-2015 Rubber, vulcanized or thermoplastic—Resistance to ozone cracking—Dynamic strain testing—method A;

Tension fatigue resistance: GB/T 1688-2008 Rubber, vulcanized—Determination of tension fatigue

TABLE 4

Comparison of results of physical properties and aging properties

| | Comparative Example | Example 1 | Example 2 | Example 3 | Example 4 |
|---|---|---|---|---|---|
| Original physical properties | | | | | |
| Tensile strength (MPa) | 19.2 | 19.2 | 19.3 | 19.2 | 19.2 |
| Elongation at break % | 520 | 530 | 530 | 525 | 530 |
| Thermal oxidative aging-resistance (100° C. *48 h) | | | | | |
| Tensile strength (MPa) | 15.7 | 16.3 | 16.0 | 15.8 | 15.8 |
| Elongation at break % | 360 | 376 | 375 | 368 | 365 |
| Physical property decline rate % | 43.4 | 39.8 | 41.0 | 42.3 | 43.0 |
| Static ozone aging-resistance (tensile 20%) | | | | | |
| Crack grade (72 h) | 3C | 3C | 3C | 3C | 3C |
| Dynamic ozone aging-resistance (tensile 10%) | | | | | |
| Crack grade (72 h) | 1C | 1C | 1C | 1C | 1C |
| Tension fatigue resistance | | | | | |
| Times at breaking (10000 times) | 278 | 301 | 295 | 285 | 290 |

The results in Table 4 show that the physical properties of the rubbers in Examples 1-4 have not changed significantly compared with Comparative Example, in which the thermal oxidative aging-resistance and tension fatigue resistance are slightly improved, indicating that the antidegradant combination of the 6PPD antidegradant with purity ≥about 98% mass percentage/S-TMQ can improve the odor degree of the tire rubber and improve the thermal oxidative aging-resistance and tension fatigue resistance of the rubber, on the premise of maintaining the physical properties of the rubber.

Test Example 4

The odor of 6PPD antidegradant 1 and 6PPD antidegradant 2 are evaluated according to the method in the Test Example 1.

The volatile substances of 6PPD antidegradant 1 and 6PPD antidegradant 2 are qualitatively analyzed according to the method in the Test Example 2.

The main physical and chemical properties, odor evaluation results, and VOC analysis results of 6PPD antidegradant 1 and 6PPD antidegradant 2 are shown in Table 5.

TABLE 5

Property comparison of 6PPD antidegradant 1 and 6PPD antidegradant 2

| | Antidegradant | |
|---|---|---|
| Test item | 6PPD antidegradant 1 | 6PPD antidegradant 2 |
| Physical and chemical properties | | |
| Purity % | 97.0 | 98.5 |
| Odor evaluation (VW 50180) | | |
| Odor grade (Normal temperature for 24 h) | 4.3 | 2.0 |
| Odor grade (80° C. for 2 hrs, and then room temperature) | 4.9 | 3.5 |

TABLE 5-continued

Property comparison of 6PPD antidegradant 1 and 6PPD antidegradant 2

| | Antidegradant | |
|---|---|---|
| Test item | 6PPD antidegradant 1 | 6PPD antidegradant 2 |
| VOC (HS-GC.MS) analysis-Taking 6PPD antidegradant 1 as the benchmark | | |
| Number of types of organic volatiles | 11 | 5 |
| Total VOC % | 100.0 | 10.0 |
| MIBK % | 100.0 | 12 |
| Aniline % | 100.0 | 6.2 |

The results in Table 5 show that under normal temperature, the odor degree of 6PPD antidegradant 2 is lower than that of 6PPD antidegradant 1, the odor grade is reduced by more than 2 grades, and 6PPD antidegradant 2 has only slight odor. The results under high temperature still show that the odor degree of 6PPD antidegradant 2 is lower than that of 6PPD antidegradant 1, and the odor grade is lower than 6PPD antidegradant 1 by more than 1 grade. The results of VOC analysis show that the types of organic volatile substances of 6PPD antidegradant 2 are more than half lower than that of 6PPD antidegradant 1, and the total VOC of 6PPD antidegradant 2 is nearly 90% lower than that of 6PPD antidegradant 1, in which the amounts of MIBK and aniline with pungent odor are also reduced by nearly 90%. This is the direct reason for the improvement of odor degree.

Test Example 5

The odor of the S-TMQ and the TMQ antidegradant are evaluated according to the method in the Test Example 1.

The volatile substances of the S-TMQ and the TMQ antidegradant are qualitatively analyzed according to the method in the Test Example 2.

The main physical and chemical properties, odor evaluation results, and VOC analysis results of the S-TMQ and the TMQ antidegradant are shown in Table 6.

TABLE 6

Property comparison of the S-TMQ and the TMQ antidegradant

| Test item | Antidegradant | |
|---|---|---|
| | TMQ antidegradant | S-TMQ |
| Physical and chemical properties | | |
| Dimer, trimer, and tetramer % | 51.0 | 80.2 |
| Odor evaluation (VW 50180) | | |
| Odor grade (Normal temperature for 24 h) | 2.3 | 1.8 |
| Odor grade (80° C. for 2 h, and then room temperature) | 3.2 | 2.7 |
| VOC (HS-GC.MS) analysis-TMQ antidegradant as benchmark | | |
| Number of types of organic volatiles | 13 | 8 |
| Total VOC % | 100.0 | 41.7 |
| Acetone % | 100.0 | 20.5 |
| Aniline % | 100.0 | 27.3 |
| TMQ monomers % | 100.0 | 64.8 |

The results in Table 6 show that under normal temperature, the odor degree of the S-TMQ is lower than that of the TMQ antidegradant, the odor grade is reduced by about 0.5 grades, and the S-TMQ has no obvious odor. The results under high temperature still show that the odor degree of the S-TMQ is lower than that of the TMQ antidegradant, and the odor grade is reduced by 0.5 grades. The VOC analysis results show that the types of organic volatile substances in the S-TMQ sample are nearly 40% lower than that of the TMQ antidegradant, the total VOC of the S-TMQ sample is about 60% mass percentage lower than that of the TMQ antidegradant, and both of the amounts of aniline and acetone with pungent odor are reduced by more than 70% mass percentage. In addition, the amount of dimer, trimer, and tetramer of the S-TMQ is more than 30% mass percentage higher than that of the TMQ antidegradant.

We claim:

1. A formulation for rubber composition consisting of
   100 parts by weight of a diene elastomer,
   30 to 70 parts by weight of a reinforcing filler,
   0.1 to 8 parts by weight of an antidegradant composition, wherein the antidegradant composition consists of N-(1,3-dimethylbutyl)-N'-phenyl p-phenylenediamine (6PPD) antidegradant and a homopolymer of 1,2-dihydro-2,2,4-trimethylquinoline (S-TMQ), purity of the 6PPD antidegradant is equal to or greater than about 98%, and a total amount of dimers, trimers, and tetramers of 1,2-dihydro-2,2,4-trimethylquinoline in the S-TMQ is equal to or greater than 80%,
   1.3 to 1.7 parts by weight of a crosslinker,
   0 to 20 parts by weight of an operating oil, wherein the operating oil is one or more selected from the group consisting of naphthenic oil, aromatic oil, processing oil, lubricating oil, petroleum asphalt, and Vaseline,
   0 to 5 parts by weight of a fatty oil softener, wherein the fatty oil softener is one or more selected from the group consisting of stearic acid, castor oil, flaxseed oil, rapeseed oil, coconut oil, beewax, carnauba wax, lanolin, tall oil, linoleic acid, palmitic acid, and lauric acid,
   0 to 10 parts by weight of an activator, and
   0.5 to 1.2 parts by weight of a promoter, wherein a ratio of the crosslinker to the promoter is in a range of 1.08 to 3.4, and
   wherein the rubber composition emits no discomforting odors after a prolonged exposure under 80° C.

2. The formulation for rubber composition according to claim 1, wherein the purity of the 6PPD antidegradant is equal to or greater than 98.5%.

3. The formulation for rubber composition according to claim 1, wherein a number of varieties of organic volatiles in the 6PPD antidegradant is no more than 5.

4. The formulation for rubber composition according to claim 1, wherein a total amount of organic volatiles in the 6PPD antidegradant is equal to or less than 10% of the total amount of the organic volatiles in a 6PPD antidegradant with a purity of 97%;
   an amount of 4-methyl-2-pentanone in the 6PPD antidegradant is equal to or less than 12% of the amount of the 4-methyl-2-pentanone in the 6PPD antidegradant with the purity of 97%; and
   an amount of aniline in the 6PPD antidegradant is equal to or less than 6.2% of the amount of aniline in the 6PPD antidegradant with the purity of 97%.

5. The formulation for rubber composition according to claim 1, wherein the total amount of the dimers, trimers, and tetramers of 1,2-dihydro-2,2,4-trimethylquinoline in the S-TMQ is equal to or greater than 80.2%.

6. The formulation for rubber composition according to claim 1,
   wherein a number of varieties of organic volatiles in the S-TMQ is no more than 8.

7. The formulation for rubber composition according to claim 1, wherein a total amount of organic volatiles in the S-TMQ is equal to or less than 41.7% of the total amount of the organic volatiles in a polymer of 1,2-dihydro-2,2,4-trimethylquinoline with a total amount of dimers, trimers, and tetramers of 1,2-dihydro-2,2,4-trimethylquinoline of 51%;
   an amount of acetone in the S-TMQ is equal to or less than 20.5% of the amount of acetone in the polymer of 1,2-dihydro-2,2,4-trimethylquinoline with the total amount of dimers, trimers, and tetramers of 1,2-dihydro-2,2,4-trimethylquinoline of 51%;

an amount of aniline in the S-TMQ is equal to or less than 27.3% of the amount of aniline in the polymer of 1,2-dihydro-2,2,4-trimethylquinoline with the total amount of dimers, trimers, and tetramers of 1,2-dihydro-2,2,4-trimethylquinoline of 51%; and an amount of 1,2-dihydro-2,2,4-trimethylquinoline monomers in the S-TMQ is equal to or less than 64.8% of the amount of 1,2-dihydro-2,2,4-trimethylquinoline monomers in the polymer of 1,2-dihydro-2,2,4-trimethylquinoline with the total amount of dimers, trimers, and tetramers of 1,2-dihydro-2,2,4-trimethylquinoline of 51%.

8. The formulation for rubber composition according to claim 1, wherein mass ratio of the 6PPD antidegradant to the S-TMQ is 1: 0.2 to 1:1 in the antidegradant composition.

9. The formulation for rubber composition according to claim 1,
wherein, based on 100 parts by weight of the diene elastomer, the formulation comprises 2 to 5 parts by weight of the antidegradant composition.

10. The formulation for rubber composition according to claim 1, wherein the diene elastomer comprises one or more selected from natural rubber, butadiene rubber, isoprene rubber, styrene butadiene rubber, chloroprene rubber, nitrile rubber, isoprene-butadiene copolymer, isoprene-styrene copolymer, and isoprene-butadiene/styrene copolymer.

11. The formulation for rubber composition according to claim 10, wherein the diene elastomer comprises natural rubber and butadiene rubber and mass ratio of the natural rubber to the butadiene rubber is from 4:6 to 6:4.

12. The formulation for rubber composition according to claim 1, wherein the reinforcing filler comprises one or more selected from carbon black, titanium oxide, magnesium oxide, calcium carbonate, magnesium carbonate, aluminum hydroxide, magnesium hydroxide, clay, and talc.

13. The formulation for rubber composition according to claim 1, wherein the crosslinker is sulfur.

14. The formulation for rubber composition according to claim 1, consisting of
100 parts by weight of the diene elastomer,
40 to 60 parts by weight of carbon black,
1.3 to 1.7 parts by weight of the sulfur,
2 to 3 parts by weight of the 6PPD antidegradant with the purity of equal to or greater than about 98% mass percentage,
0.5 to 2 parts by weight of the S-TMQ,
2 to 8 parts by weight of zinc oxide,
1 to 3 parts by weight of stearic acid,
1 to 10 parts by weight of naphthenic oil, and
0.5 to 1.2 parts by weight of a promoter, wherein a ratio of the crosslinker to the promoter is in a range of 1.08 to 3.4,
wherein the diene elastomer comprises natural rubber and butadiene rubber with a mass ratio of from 4:6 to 6:4, and
wherein the rubber composition emits no discomforting odors after a prolonged exposure under 80° C.

15. The formulation for rubber composition according to claim 1, wherein the purity of the 6PPD antidegradant is 98.5%;

a number of varieties of organic volatiles in the 6PPD antidegradant is 5;

a total amount of the organic volatiles in the 6PPD antidegradant is about 10% of the total amount of the organic volatiles in a 6PPD antidegradant with a purity of 97%, an amount of 4-methyl-2-pentanone in the 6PPD antidegradant is about 12% of the amount of 4-methyl-2-pentanone in the 6PPD antidegradant with the purity of 97%; and an amount of aniline in the 6PPD antidegradant is about 6.2% of the amount of aniline in the 6PPD antidegradant with the purity of 97%.

16. The formulation for rubber composition according to claim 1, wherein a total amount of dimers, trimers, and tetramers of 1,2-dihydro-2,2,4-trimethylquinoline in the S-TMQ is 80.2%;

a number of varieties of organic volatiles in the S-TMQ is 8;

a total amount of organic volatiles in the S-TMQ is 41.7% of the total amount of the organic volatiles in a polymer of 1,2-dihydro-2,2,4-trimethylquinoline with a total amount of dimers, trimers, and tetramers of 1,2-dihydro-2,2,4-trimethylquinoline of 51%, an amount of acetone in the S-TMQ is 20.5% of the amount of acetone in the polymer of 1,2-dihydro-2,2,4-trimethylquinoline with the total amount of dimers, trimers, and tetramers of 1,2-dihydro-2,2,4-trimethylquinoline of 51%, an amount of aniline in the S-TMQ is 27.3% of the amount of aniline in the polymer of 1,2-dihydro-2,2,4-trimethylquinoline with the total amount of dimers, trimers, and tetramers of 1,2-dihydro-2,2,4-trimethylquinoline of 51%, and an amount of 1,2-dihydro-2,2,4-trimethylquinoline monomers in the S-TMQ is 64.8% of the amount of the 1,2-dihydro-2,2,4-trimethylquinoline monomers in the polymer of 1,2-dihydro-2,2,4-trimethylquinoline with the total amount of dimers, trimers, and tetramers of 1,2-dihydro-2,2,4-trimethylquinoline of 51%.

17. A rubber article comprising a rubber composition prepared according to the formulation for rubber composition as described in claim 1.

18. A method for improving odor, thermal oxidative aging-resistance, tension fatigue resistance, or a combination thereof, in a rubber composition or rubber article according to claim 1, comprising
preparing the formulation for a rubber composition as described in claim 1, and
preparing the rubber composition or a rubber article from the formulation.

19. The formulation for rubber composition according to claim 1, wherein the activator is zinc oxide.

20. The formulation for rubber composition according to claim 1, wherein the promotor is one or more selected from the group consisting of sulfonamide, thiazole, thiuram, thiourea, guanidine, dithiocarbamate, aldimine, aldehyde ammonia, imidazoline, and xanthic acid.

* * * * *